United States Patent
Luo et al.

(10) Patent No.: US 11,899,574 B2
(45) Date of Patent: *Feb. 13, 2024

(54) L2P TRANSLATION TECHNIQUES IN LIMITED RAM SYSTEMS TO INCREASE RANDOM WRITE PERFORMANCE USING MULTIPLE L2P CACHES

(71) Applicant: Micron Technology, Inc., Boise, ID (US)

(72) Inventors: Xiangang Luo, Fremont, CA (US); Qing Liang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,542

(22) Filed: Oct. 13, 2022

(65) Prior Publication Data
US 2023/0031365 A1   Feb. 2, 2023

Related U.S. Application Data

(63) Continuation of application No. 16/586,519, filed on Sep. 27, 2019, now Pat. No. 11,487,653.

(51) Int. Cl.
| | | |
|---|---|---|
| G06F 12/02 | (2006.01) | |
| G06F 12/0804 | (2016.01) | |
| G06F 12/0873 | (2016.01) | |
| G06F 12/1045 | (2016.01) | |
| G06F 13/16 | (2006.01) | |

(52) U.S. Cl.
CPC ...... *G06F 12/0246* (2013.01); *G06F 12/0804* (2013.01); *G06F 12/0873* (2013.01); *G06F 12/1054* (2013.01); *G06F 13/1668* (2013.01); *G06F 2212/7201* (2013.01)

(58) Field of Classification Search
None
See application file for complete search history.

(56) References Cited

U.S. PATENT DOCUMENTS 5,493,660 A    2/1996   DeLano et al.
2014/0304453 A1*  10/2014  Shao ............... G06F 12/0246
                                                   711/103

(Continued)

OTHER PUBLICATIONS

"International Application Serial No. PCT/US2020/052480, International Search Report dated Dec. 9, 2020", 3 pgs.

(Continued)

*Primary Examiner* — Kaushikkumar M Patel
(74) *Attorney, Agent, or Firm* — Schwegman Lundberg & Woessner, P.A.

(57) ABSTRACT

Devices and techniques are disclosed herein for more efficiently performing random write operation for a memory device. In an example, a method of operating a flash memory device can include receiving a write request at a flash memory device from a host, the write request including a first logical block address and write data, saving the write data to a location of the flash memory device having a first physical address, operating the flash memory device in a first mode when an amount of write data associated with the write request is above a threshold, operating the flash memory device in a second mode when an amount of write data is below the threshold, and comparing the amount of write data to the threshold.

20 Claims, 5 Drawing Sheets

(56) References Cited

U.S. PATENT DOCUMENTS

| | | |
|---|---|---|
| 2016/0378359 A1 | 12/2016 | Jang et al. |
| 2018/0293174 A1* | 10/2018 | Song ................... G06F 12/1009 |
| 2019/0220416 A1 | 7/2019 | Jung et al. |
| 2020/0012601 A1 | 1/2020 | Jeong et al. |
| 2021/0096984 A1 | 4/2021 | Luo et al. |

OTHER PUBLICATIONS

"International Application Serial No. PCT/US2020/052480, Written Opinion dated Dec. 9, 2020", 8 pgs.

* cited by examiner

L2P TRANSLATION TECHNIQUES IN LIMITED RAM SYSTEMS TO INCREASE RANDOM WRITE PERFORMANCE USING MULTIPLE L2P CACHES

PRIORITY APPLICATION

This application is a continuation of U.S. application Ser. No. 16/586,519, filed Sep. 27, 2019, which is incorporated herein by reference in its entirety.

TECHNICAL FIELD

Examples of the disclosure relate generally to memory systems, and more particularly, to techniques for implementing a translation cache for random memory access events.

BACKGROUND

Memory devices are typically provided as internal, semiconductor, integrated circuits in computers or other electronic devices. There are many different types of memory including volatile and non-volatile memory. Memory devices can often be structured as random-access memory (RAM).

Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

The memory or storage system of an electronic device can effect a number of performance metrics that can sway a user between choosing one electronic device over a competitor's electronic device. Data storage and retrieval delays are two such metrics. Conventional flash memory systems such as for mobile systems have limited RAM and can only keep a portion of the L2P table in the RAM. If the incorrect portion of the L2P table is not in RAM, performance delay is encountered to allow for accessing the correct portion of the L2P table from flash memory. For random write type events, each system unit of data written (e.g., typically 4K) can require accessing flash memory to locate the correct physical address of the flash system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
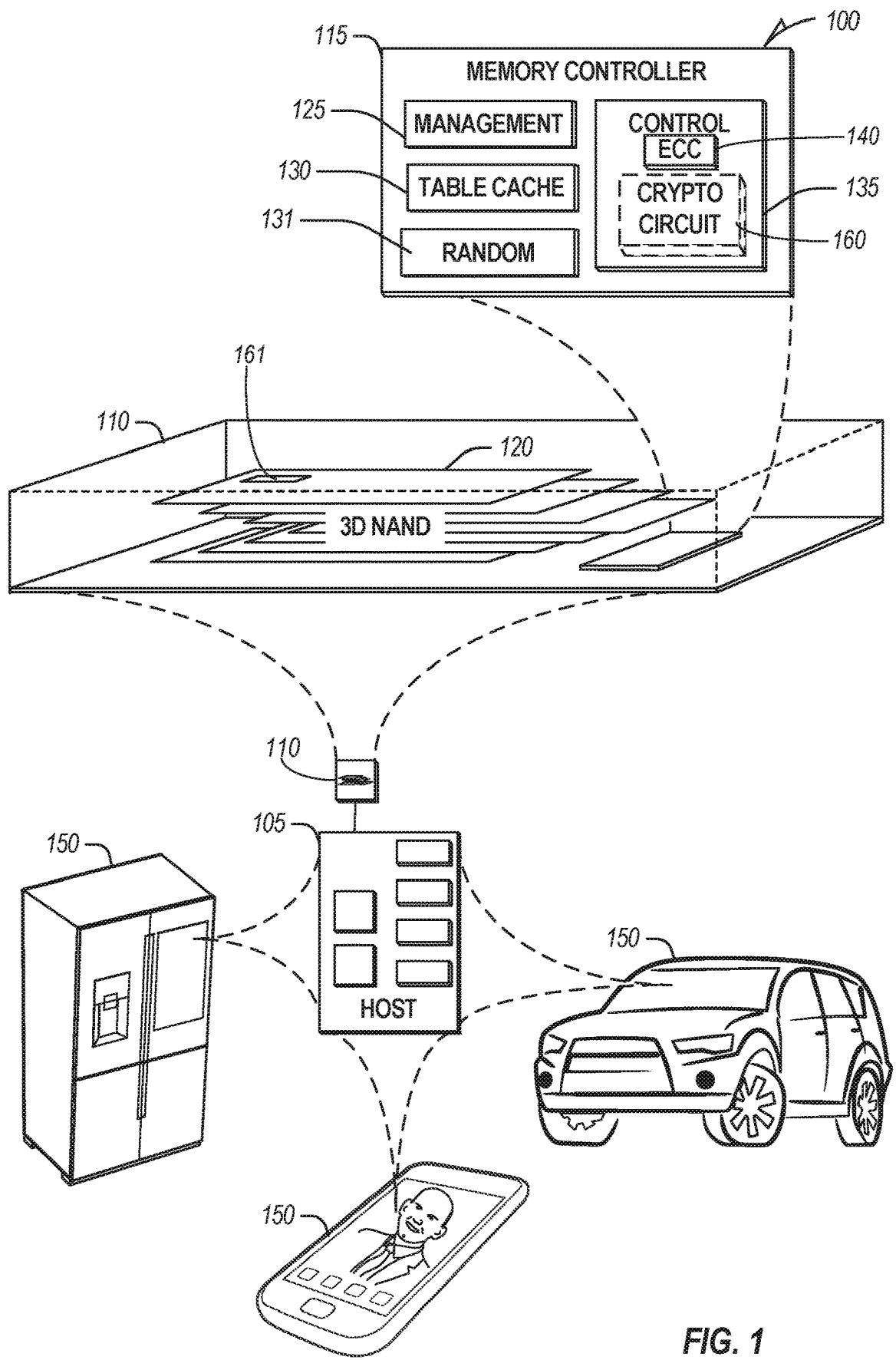
FIG. 1 illustrates an example of an environment including a host and a memory device configured to communicate over a communication interface according to the present subject matter.

Storage systems, such as but not limited to, NAND memory devices and systems, commonly include a flash transition layer (FTL) to translate logical addresses used by a host device for managing data, often referred to as logical block addresses (LBAs), to corresponding memory physical addresses (PAs), often referred to as physical block addresses (PBAs) of the storage system. The FTL can use, for example, a logical-to-physical (L2P) mapping table (L2P table), which correlates LBAs with PBAs, to perform the translation. Mobile storage devices typically have a cache with constrained size, and thus often lack memory to store an entire mapping table. Therefore, portions of the mapping table(s) can be retrieved from the flash memory on demand, which can cause random read performance degradation.

Translation tables are generally loaded into an internal memory of the controller. If the table size is greater than the internal memory (e.g., in random access memory (RAM), such as dynamic RAM (DRAM) or static RAM (SRAM) of the controller, a portion of the table is loaded into the internal memory and the remainder of the table is stored in other storage (such as NAND flash array elements). If a translation request (e.g., a logical-to-physical (L2P) mapping) is not in the internal memory, the controller replaces the internal memory portion of the table with the appropriate portion from other storage. This process can increase latencies when performing operations such as reading or writing to the storage device. Although increased internal memory can reduce these occurrences, this comes at a manufacturing and power cost that can be unacceptable for a given application.

To address the issue of swapping portions of the translation tables into and out of internal memory, the translation tables can be delivered to a host (with presumably greater memory resources than the storage device), allowing the host to indicate which physical address a given operation applies. This is referred to herein as host-cached L2P mapping, though it can also be referred to as host performance booster (HPB), unified memory extension (UME), or host memory buffer (HMB) in some contexts. In these arrangements, the controller is ultimately responsible for maintaining the translation tables and updating the host with changes to the translation tables, but the host can provide the controller with the physical addresses to be operated upon along with the traditional command and logical address. Because the physical address is provided by the host, the controller can avoid referencing the translation tables when performing an operation, increasing efficiency or decreasing latency when performing the operation. The physical address can be encapsulated into a payload (e.g., physical address payload).

In certain implementations of a memory device, such as but not limited to, a flash memory device, improvements in random write workload performance can contribute significantly to overall system performance. For example, in such memory devices that employ a L2P table cache, the flash memory may need to be accessed for each random write not only to program the flash memory with write data but to also have the correct portion of the L2P table in the L2P table cache for updating with the PA of the write operation. The present inventors have recognized techniques that can limit or buffer updating the L2P table cache for a fair portion of random write operations. Limiting or buffering the L2P table updates during periods of heavy memory access operations can profoundly improve system efficiency during those periods. The techniques do not eliminate updating the complete L2P table in the flash memory device, but such operations can be delayed. Such delay can allow the updating operations to occur during periods of lighter demand for memory access operations and therefore improve the user experience of the system including the memory device.

Memory devices include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices the controller functionality may be implemented on one or more die also incorporating a memory array, or on a separate die. In other examples, one or more memory devices may be combined with controller functionality to form a solid-stage drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMCT™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard. Managed NAND devices can be used as primary or ancillary memory in various forms of electronic devices, and are commonly used in mobile devices.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device. In certain examples, one or more memory die of the memory array 120 can include a first complete L2P table 161 for mapping logical block addresses (LBAs) of the host with physical addresses (PAs) of the flash memory. In certain examples, the table can store the physical address and can be indexed by the logical block address to conserve storage space.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMCT™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 500 of FIG. 5. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

The described memory device 110 can optionally include a cryptography circuitry 160 in association with the memory array 120. In certain examples, the cryptography circuitry 160 can include an encryption circuit, a decryption circuit, or a combination thereof. In some implementations, memory controller 115 of memory device 110 may include control circuitry configured to implement the functions of the cryptography circuit 160. In other implementations, the cryptography circuit 160 may include an independent control circuitry for implementing the described functionality. In yet other implementations, control circuitry may be divided between the cryptography circuit 160 and memory controller 115 to implement the described functions of the cryptography circuit 160. In the depicted example, the array controller 135 forms a portion of the memory controller 115, and the cryptography circuit 160 forms a portion of the array controller. In other implementations, cryptography circuit 160 may be external, and/or outside of array controller 135. For example, the cryptography circuit 160 (or any individual components thereof), may be an independent component coupled to one or more components in environment 100. However physically located, the structures providing the additional functionality of the cryptography circuit 160, function to verify physical addresses provided by the host 105 to prevent erroneous or malicious access to the memory device and to provide opportunities for the host to refresh the host-resident mapping table information to align the mapping information with the mapping information of the memory device during host-resident FTL operation of the environment 100.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables configured to maintain various information associated with one or more components of the memory device 110 (e.g., various information associated with a memory array or one or more memory cells coupled to the memory controller 115). For example, the management tables can include information regarding block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables can maintain a count of correctable or uncorrectable bit errors, among other things.

In certain examples, the memory controller 115 can include a table cache 130 for storing a portion of the FTL table 161 stored on the die of the memory array. In certain examples, the memory of the table cache 130 is faster than the memory of the memory array 120 and can assist in more quickly responding to memory access requests of the host. In certain examples, the memory controller 115 can include a random cache 131. Operation of the random cache is discussed below, however, in certain examples, especially when servicing write requests, the random cache can store mapping information of write requests that have a relatively small amount of non-sequential write data. The cache allows vary efficient operation especially in systems where the host maintains an FTL table. In such systems, the random cache eliminates the need to replace the FTL table cache with mapping information associated with each LBA of each non-sequential write operation. For example, without the random cache, each write operation associated with each write request having a small amount of write data generally required the FTL table cache 130 to be updated with a different portion of the FTL table 161 stored in the memory array 120. For many random write requests, accessing the FTL table 161 for each request can significantly contribute to lowering the memory device performance.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector or block.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

Figure 2:
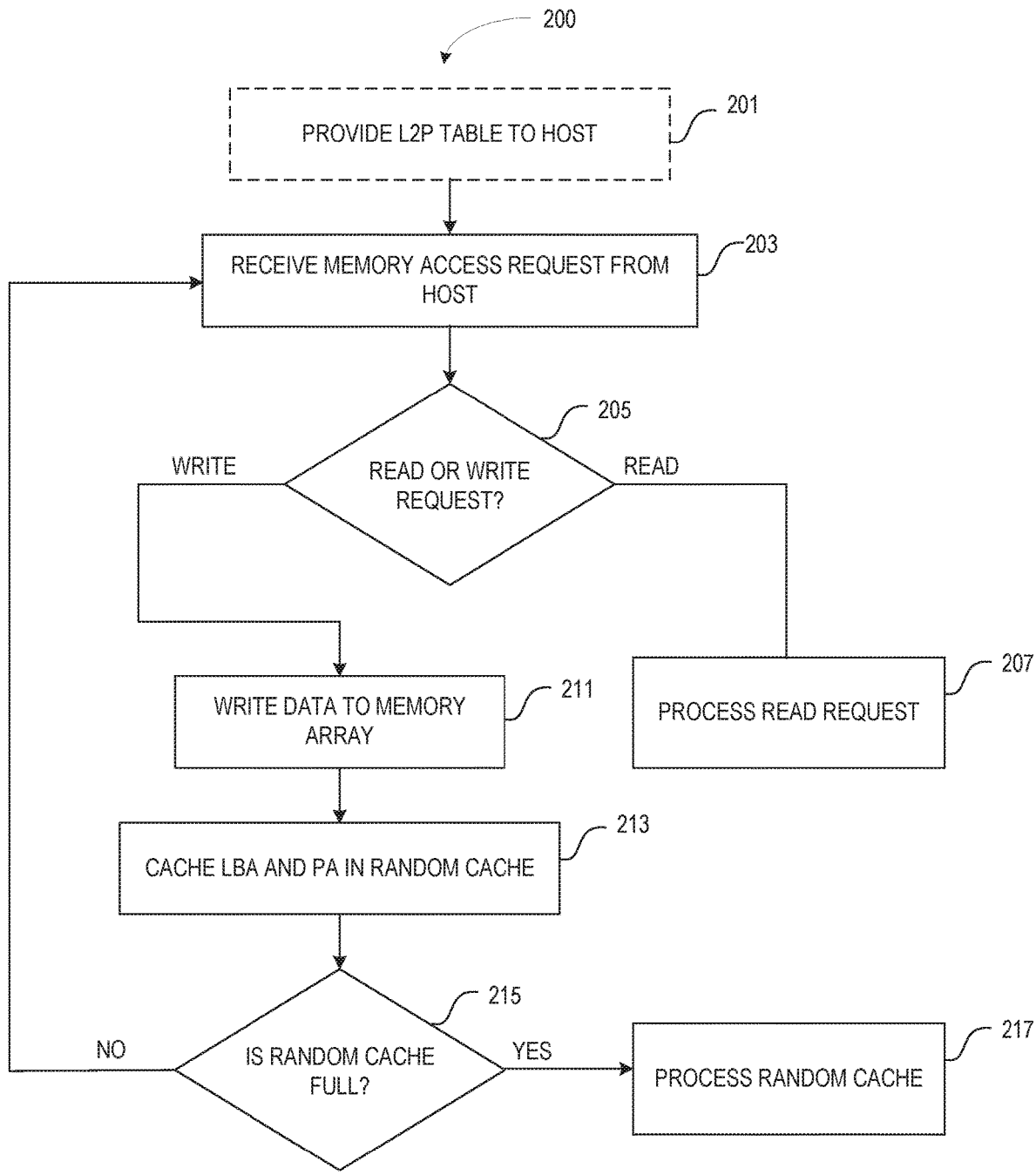
FIG. 2 illustrates generally a flowchart of an example method of operating a storage device or memory device according to the present subject matter.

FIG. 2 illustrates generally a flowchart of an example method of operating a storage device or memory device according to the present subject matter as implemented n system such as the example system of FIG. 1. At 201, mapping information of the storage device can optionally be provided to a host. In some examples, the mapping information can allow the host to, at least initially, determine where data is stored on the memory of the storage device. In certain examples, portions of the mapping information, such as the physical addresses of the memory of the storage device, can be encrypted to prevent malicious information from being stored on the storage device. At 203, a memory access requests can be received at the memory device. In certain examples the memory request can include an LBA of the host, a PA of the storage device, write data, or combination thereof. At 205, the memory controller of the storage device can determine if the memory access request can is a read access request or a write access request. In certain examples, such a determination can be made by reviewing a operation code of the request. When a request is determined to be read request, at the 207, the memory controller can process the read access request. In certain examples, the read access request can be processed according to the flowchart of FIG. 4. When a request is determined to be write access request, at the 211, the memory controller can write the write data to the memory array of the storage device. In certain examples, writing the write data to the memory array can include determining a physical address of a location of the memory array at which to program the write data.

At 213, the LBA of the request and the PA associated with programming the write data in the memory array can be stored in the random cache. In certain examples, when the amount of write data associated with the write access command is larger than a predetermined threshold, the mapping information associated with the write access request and subsequent programming operation can be processed and saved in the table cache or the complete L2P table of the memory array according to conventional methods. As such, the memory controller may compare the amount of write data with the predetermined threshold and cache the LBA and PA in the random cache, at 213, when the amount of write data is less than the predetermined threshold.

Since the amount of cache memory, both for the table cache and for the random cache is limited, at 215, a determination of whether the random cache is full can be assessed, for example, by the memory controller. When the random cache is not full, mapping information for an additional write access request can be stored in the random cache and flow can proceed to waiting for and processing a next memory access request from the host at 203. When the random cache is full, the random cache is flushed at 217. Flushing the random cache can result in the random cache being empty of mapping information and ready for accepting mapping information associated with subsequent write access requests from the host. In addition, flushing the random cache can include saving the mapping information of the random cache in the table cache, in the L2P table in the memory array, or in a combination of the table cache and the L2P table. In certain examples, flushing or processing the random cache can be executed according to the flowchart of FIG. 3.

Figure 3:
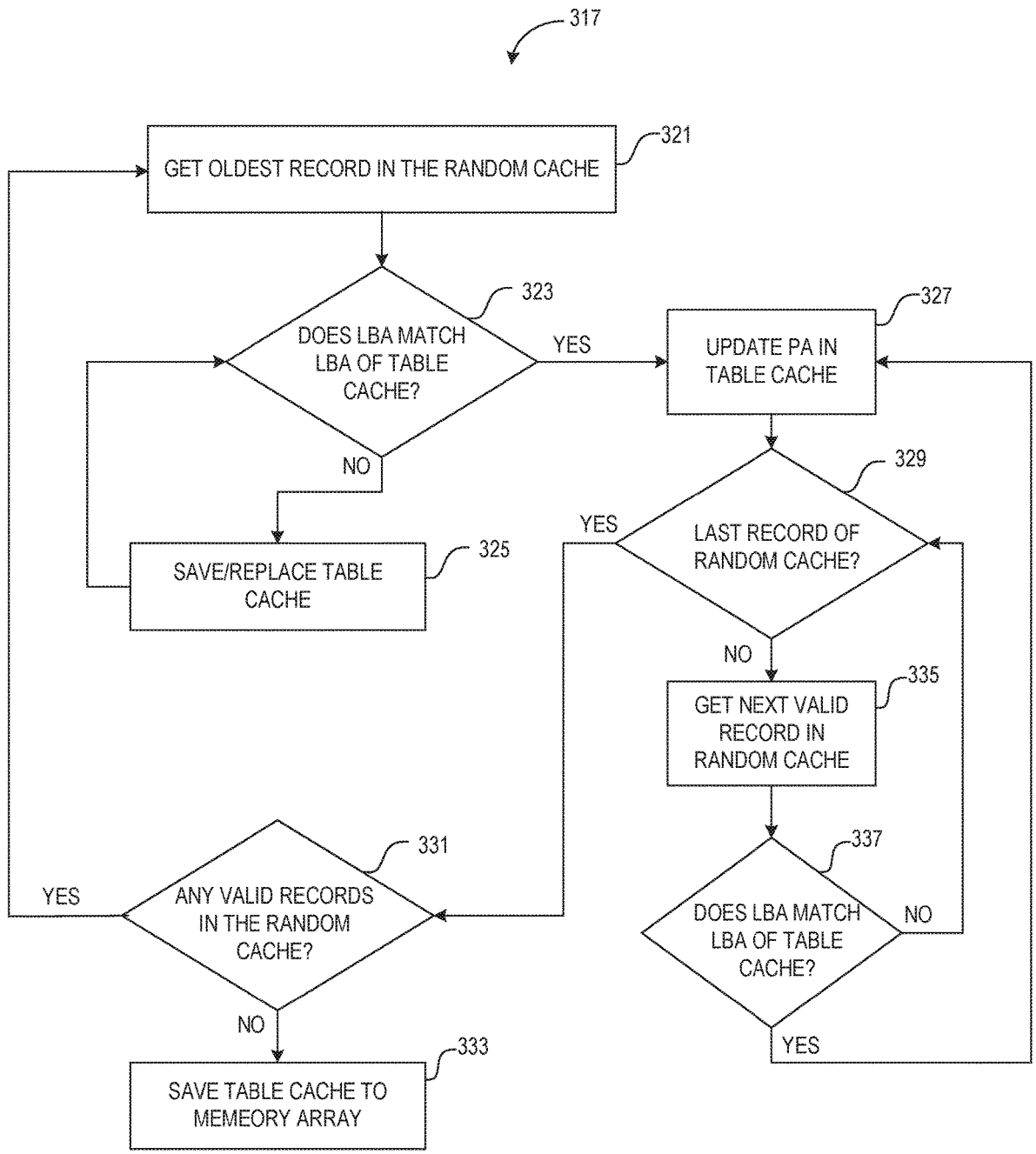
FIG. 3 illustrates generally a flowchart of an example method of processing the random cache as discussed above with respect to the flowchart of FIG. 2 or the system of FIG. 1.

FIG. 3 illustrates generally a flowchart of an example method 307 of processing the random cache as discussed above with respect to the flowchart of FIG. 2 or the system of FIG. 1. At 321, the oldest record of the random cache can be accessed. In certain examples, the random cache can be fixed length and can be filled like a list each new record can be appended to the end of the cache/list. As such, the oldest record can be the first record of the list/cache and can have a predetermined location. It is understood that other methods of creating a cache and storing records are possible such that the oldest record can be identified and accessed, and such methods do not depart from the scope of the present subject matter. At 323, the LBA of the oldest record can be evaluated or compared to the LBAs of the table cache. When the LBA of the oldest record does not match an LBA of the table cache, at 325, the portion of the L2P table in the table cache can be replaced by first saving the table cache to the L2P table of the memory array and then replacing the records of the table cache with a different portion of the L2P table of the memory array. Method flow can return to 323 to verify that the LBA of the oldest record matches an LBA of the table cache.

When the LBA of the oldest record of the random cache matches an LBA of the table cache, at 327, the PA of the corresponding LBA of the table cache can be updated with the PA of the oldest record of the random cache. In certain examples, the oldest record of the random cache can be recorded, marked or otherwise indicated as invalid upon updating the corresponding record of the table cache.

At 329, the random cache is evaluated to determine of any records remain in the random cache. If the oldest record of the random cache retrieved at from the random cache at 321 is the last record in the random cache, at 331, the random cache is evaluated to determine if any valid records remain in the random cache. If no valid records remain in the random cache, at 333, the table cache is saved to the complete L2P table in the memory array. If, at 331, additional valid records remain in the random cache, the method returns to retrieving the oldest of the records at 321.

Referring back to the evaluation at 329, if the record last retrieved from the random cache is not the last record in the random cache, at 335, the next record in the random cache is retrieved. The retrieved record id then evaluated to determine whether the LBA of the retrieved record matches the LBA of the table cache at 337. If LBA of the retrieved record matches an LBA of the table cache, the table cache is updated with the PA of the retrieved record at 327. If the LBA of the retrieved record does not match an LBA of the table cache, the retrieved record is ignored for the time being and the next record is retrieved at 329.

In general, the method 317 of processing of the random cache operates to identify the LBAs in the random cache that have corresponding LBAs in the table cache, update the PAs of the table cache accordingly, and save the table cache to the complete L2P table in the memory array. If record remain in the random cache, a record is retrieved, the table cache is replaced with a portion of the complete L2P table corresponding to the LBA of the retrieved record and the method 317 is repeated. Upon the method 316 of processing the random cache, the random cache is empty of valid records and is ready to facilitate high-speed writes of relatively small amounts of random write data to the memory array.

Figure 4:
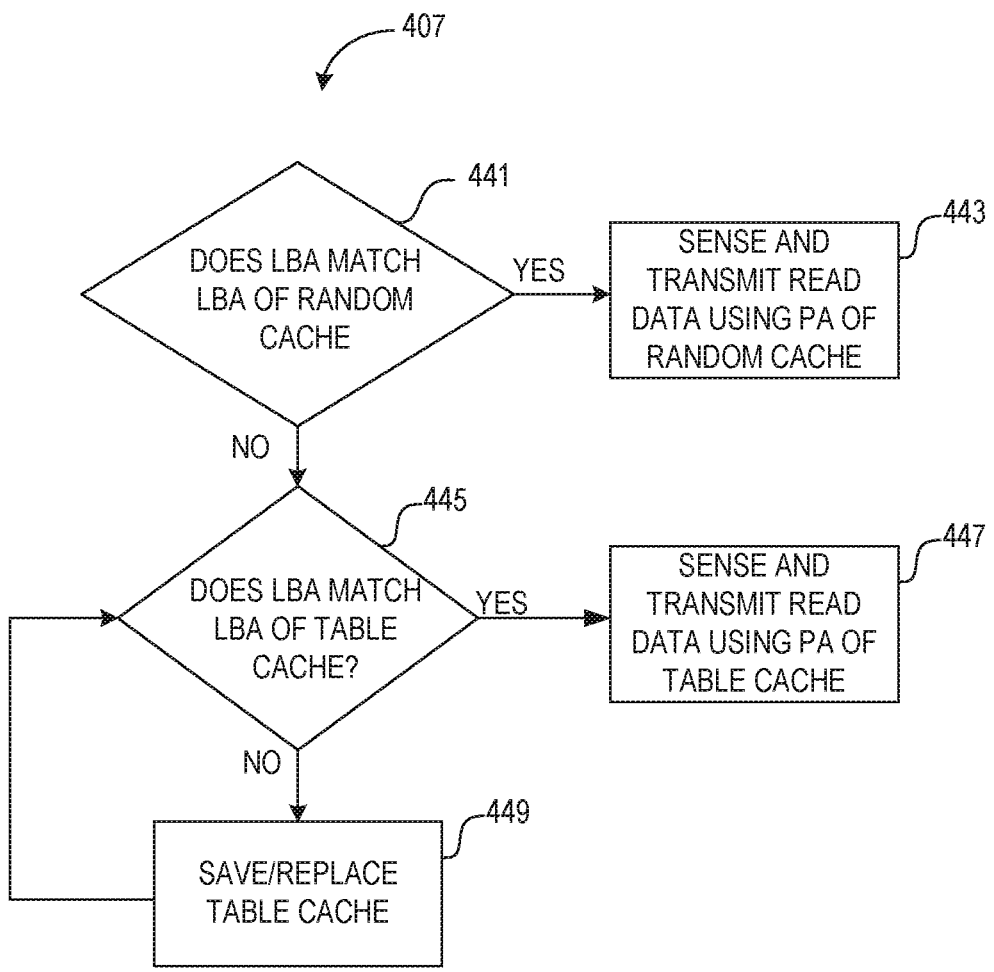
FIG. 4 illustrates generally and flowchart of an example method for processing a read request according to the present subject matter and as related to flowchart of FIG. 2 or the system of FIG. 1.

FIG. 4 illustrates generally and flowchart of an example method 407 for processing a read request according to the present subject matter and as related to flowchart of FIG. 2 or the system of FIG. 1. At 441, read information of the read request is evaluated to determine whether the LBA of the read request corresponds to an LBA of the random cache. If so, at 443, the read data is sensed from the memory array using the PA of the corresponding record of the random cache and is transmitted to the host. If, at 441, the LBA of the read request does not match an LBA of the random cache, at 445, read information of the read request is evaluated to determine whether the LBA of the read request corresponds to an LBA of the table cache. If the LBA of the read request does match an LBA of the table cache, at 447, the read data is sensed from the memory array using the PA of the corresponding record of the table cache and is transmitted to the host.

If, at 445, the LBA of the read request does not match an LBA of the table cache, at 449, the table cache is saved to the complete L2P table in the memory array and replaced with a new portion of the L2P table corresponding to the LBA of the read request. Method control then returns to evaluating the read request information to determine whether the LBA of the read request corresponds to an LBA of the table cache at 445.

Figure 5:
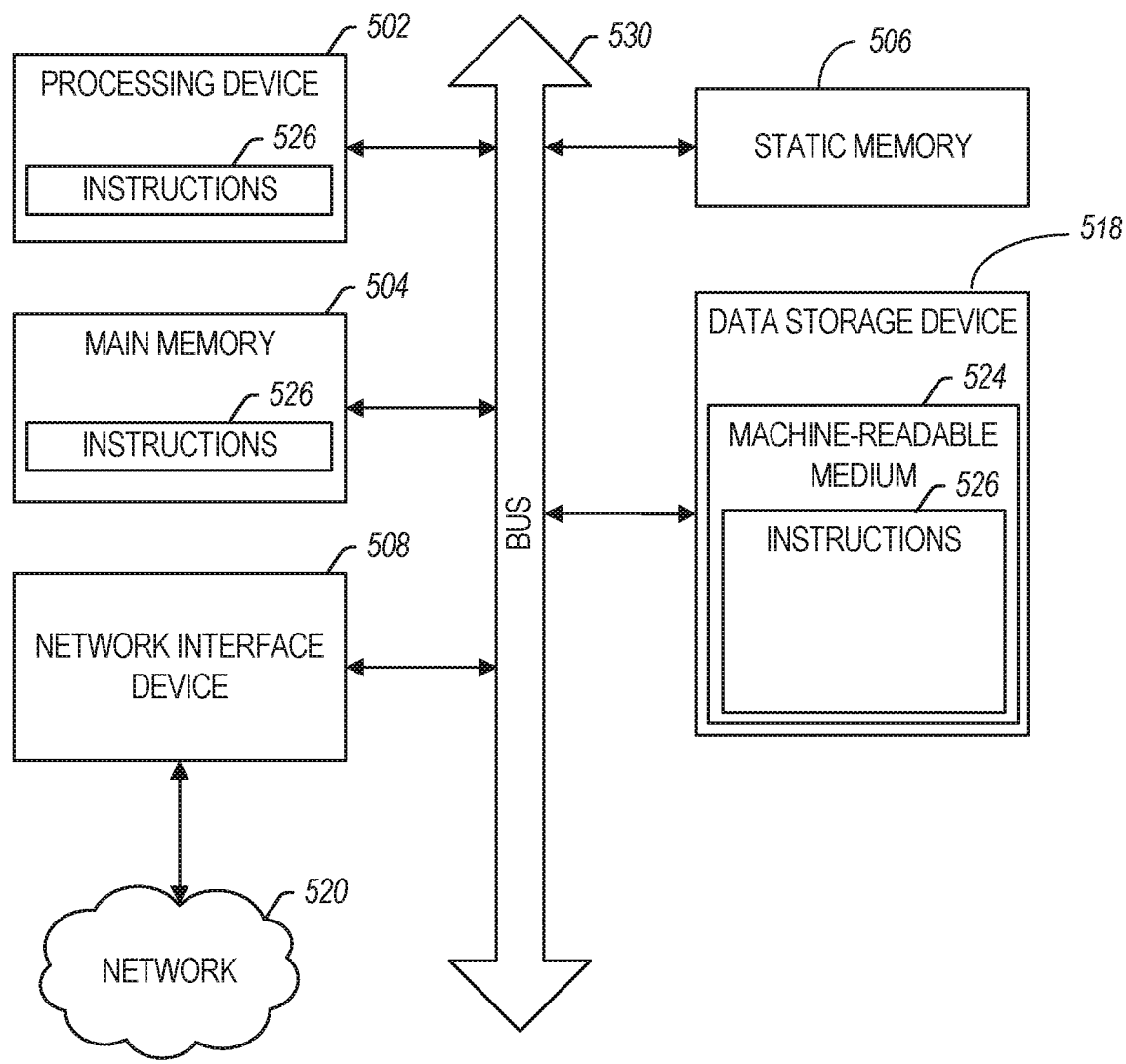
FIG. 5 illustrates a block diagram of an example machine upon which any one or more of the techniques (e.g., methodologies) discussed herein may perform.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host 105, the memory device 110, etc.) may include a processing device 502 (e.g., a hardware processor, a central processing unit (CPU), a graphics processing unit (GPU), a hardware processor core, or any combination thereof, such as a memory controller of the memory device 110, etc.), a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, some or all of which may communicate with each other via an interlink (e.g., bus) 530.

The processing device 502 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 or within the processing device 502 during execution thereof by the computer system 500, the main memory 504 and the processing device 502 also constituting machine-readable storage media. The machine-readable storage medium 524, the data storage system 518, or the main memory 504 can correspond to the memory device 110 of FIG. 1.

In one implementation, the instructions 526 include instructions to implement functionality corresponding to providing efficient random write operations discussed above with respect to FIG. 2, FIG. 3, and FIG. 4. While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 500 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 500 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 526 (e.g., software, programs, an operating system (OS), etc.) or other data are stored on the data storage device 518 can be accessed by the main memory 504 for use by the processing device 502. The main memory 504 (e.g., DRAM) is typically fast, but volatile, and thus a different type of storage than the data storage device 518 (e.g., an SSD), which is suitable for long-term storage, including while in an "off" condition. The instructions 526 or data in use by a user or the machine 500 are typically loaded in the main memory 504 for use by the processing device 502. When the main memory 504 is full, virtual space from the data storage device 518 can be allocated to supplement the main memory 504; however, because the data storage device 518 device is typically slower than the main memory 504, and write speeds are typically at least twice as slow as read speeds, use of virtual memory can greatly reduce user experience due to storage device latency (in contrast to the main memory 504, e.g., DRAM). Further, use of the data storage device 518 for virtual memory can greatly reduce the usable lifespan of the data storage device 518.

In contrast to virtual memory, virtual memory compression (e.g., the Linux™ kernel feature "ZRAM") uses part of the memory as compressed block storage to avoid paging to the data storage device 518. Paging takes place in the compressed block until it is necessary to write such data to the data storage device 518. Virtual memory compression increases the usable size of the main memory 504, while reducing wear on the data storage device 518.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 524 may further be transmitted or received over a network 520 using a transmission medium via the network interface device 508 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 508 may include one or more physical jacks (e.g., Ethernet, coaxial, or phone jacks) or one or more antennas to connect to the network 520. In an example, the network interface device 508 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

Additional Notes and Examples

Example 1 is a memory system, comprising: a storage array configured to store an indexed mapping information in multiple records indexed by a logical block address of a host, wherein individual records of the multiple records are configured to hold a physical address of the storage array; a first cache configured to store a first contiguous portion of the indexed mapping information; and a second cache configured to store a multiple of records of non-indexed mapping information of the storage array, wherein individual records of the multiple records of non-indexed mapping information are configured to include, a host address and a corresponding physical address of the storage array.

In Example 2, the subject matter of Example 1 includes, a controller configured to: compare an amount of write data to a threshold, the write data associated with a respective write request of the host; operate the memory system in a first mode to perform a write operation when the amount of write data exceeds a threshold; and operate the memory system in a second mode to perform the write operation when the amount of write data does not exceed the threshold.

In Example 3, the subject matter of Example 2 includes, wherein during the second mode, the controller is configured to: write the write data to the storage array at a first physical address; store the first physical address in a first record of the non-indexed mapping information of the second cache; and store a first logical block address of the host in the first record to provide a first valid record, the first logical block address received from the host with the respective write request.

In Example 4, the subject matter of Example 3 includes, wherein, during the second mode, the controller is configured to determine if the second cache is full of valid records; and to empty the second cache of valid records in response to the controller determining the second cache is full.

In Example 5, the subject matter of Example 4 includes, wherein in response to determining the second cache is full, the controller is configured to: retrieve a second valid record of the second cache; and determine if a logical block address of the second valid record is associated with a record of the first cache.

In Example 6, the subject matter of Example 5 includes, wherein, when the logical block address of the second valid record is associated with the record of the first cache, the controller is configured to: store the physical address of the second valid record in the record of the first cache; and indicate the second valid record of the second cache is an invalid record to provide a second record.

In Example 7, the subject matter of Examples 5-6 includes, wherein, when the logical block address of the second valid record is not associated with any record of the first cache, the controller is configured to: replace the first contiguous portion of the indexed mapping information of the first cache with a second contiguous portion of the indexed mapping information from the storage array, wherein the second contiguous portion of the indexed mapping information includes a record associated with the logical block address of the second valid record of the second cache.

In Example 8, the subject matter of Examples 5-7 includes, wherein the second valid record of the second cache is an oldest valid record of the second cache.

In Example 9, the subject matter of Examples 2-8 includes, wherein during the first mode, the controller is configured to: write the write data to the storage array at a first physical address; update a first record of the first contiguous portion of the indexed mapping information of the first cache when the first record is associated with a first logical block address, the first logical block address received from the host with the respective write request; and when the first contiguous portion of the indexed mapping information of the first cache does not include a record associated the first logical block address, replace the first contiguous portion of the indexed mapping information of the first cache with a second contiguous portion of the indexed mapping information from the storage array, wherein the second contiguous portion of the indexed mapping information includes a first record associated with the logical block address of the respective write request; and update the first record of the second contiguous portion of the indexed mapping information of the first cache with the first physical address.

Example 10 is a method comprising: receiving at a memory device multiple write requests from a host, the write requests including a respective logical block address and write data; saving the write data over respective write requests to a location of the memory device having respective physical addresses; operating the memory device in a first mode when an amount of write data associated with a first write request is above a threshold; operating the memory device in a second mode when an amount of write data associated with a second write request is below the threshold; and comparing the amount of write data to the threshold.

In Example 11, the subject matter of Example 10 includes, populating a first cache with a first contiguous portion of indexed mapping information received from a mapping table of indexed mapping information stored within the memory device, wherein the mapping table includes records of physical addresses of the memory device indexed by one of a plurality of logical block addresses of the host.

In Example 12, the subject matter of Example 11 includes, wherein operating the memory device in a second mode includes storing the respective logical block address and the respective physical address in a first record of a plurality of records of unindexed mapping information of a second cache to provide a first valid record of the plurality of records of unindexed mapping information of the second cache.

In Example 13, the subject matter of Example 12 includes, wherein operating the memory device in a second mode includes determining when the plurality of records of the unindexed mapping information of the second cache are full of valid records.

In Example 14, the subject matter of Example 13 includes, flushing the plurality of records of the unindexed mapping information of the second cache of valid records in response to determining the plurality of records of the unindexed mapping information of the second cache are full of valid records.

In Example 15, the subject matter of Examples 13-14 includes, wherein flushing of the plurality of records of unindexed mapping information of the second cache includes repeatedly retrieving and processing a second valid record from the plurality of records of unindexed mapping information of the second cache until no valid records remain in the plurality of records of unindexed mapping information of the second cache.

In Example 16, the subject matter of Example 15 includes, wherein the processing the second valid record includes: determining whether a logical address of the second valid record corresponds to a logical address of the first contiguous portion.

Example 17 is a machine-readable medium including, when executed by a machine, cause the machine to perform operations comprising: receiving a write request at a flash memory device from a host, the write request including a first logical block address and write data; saving the write data to a location of the flash memory device having a first physical address; operating the flash memory device in a first mode when an amount of write data associated with the write request is above a threshold; operating the flash memory device in a second mode when an amount of write data is below the threshold; and comparing the amount of write data to the threshold.

In Example 18, the subject matter of Example 17 includes, wherein the operations include populating a first cache with a first contiguous portion of indexed mapping information received from a mapping table of indexed mapping information stored within the flash memory device, wherein the mapping table includes records of physical addresses of the flash memory device indexed by one of a plurality of logical block addresses of the host.

In Example 19, the subject matter of Example 18 includes, wherein operating the flash memory device in a second mode includes storing the first logical block address and the first physical address in a first record of a plurality of records of unindexed mapping information of a second cache to provide a first valid record of the plurality of records of unindexed mapping information of the second cache.

In Example 20, the subject matter of Example 19 includes, wherein operating the flash memory device in a second mode includes determining when the plurality of records of the unindexed mapping information of the second cache are full of valid records.

In Example 21, the subject matter of Example 20 includes, wherein the operations include flushing the plurality of records of the unindexed mapping information of the second cache of valid records in response to determining the plurality of records of the unindexed mapping information of the second cache are full of valid records.

In Example 22, the subject matter of Example 21 includes, wherein the flushing of the plurality of records of unindexed mapping information of the second cache includes repeatedly retrieving and processing a second valid record from the plurality of records of unindexed mapping information of the second cache until no valid records remain in the plurality of records of unindexed mapping information of the second cache.

In Example 23, the subject matter of Example 22 includes, wherein the processing the second valid record includes determining whether a logical address of the second valid record corresponds to a logical address of the first contiguous portion.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory system, comprising:
a controller, configured to perform operations comprising:
receive a write request;
responsive to receiving the write request, compare an amount of data to be written in the write request to a threshold amount of data;
responsive to a determination that the amount of data to be written in the write request exceeds the threshold amount of data, storing a mapping between a physical and logical address corresponding to the write request in a first cache, the first cache configured to store, in a volatile memory, contiguous portions of a logical-to-physical mapping table indexed by logical block address;
responsive to a determination that the amount of data to be written in the write request does not exceed the threshold amount of data, storing the mapping in a second cache, the second cache configured to store, in a volatile memory, non-contiguous portions of the logical-to-physical mapping table indexed by logical block address;

determine if the second cache is full; and in response to a determination that the second cache is full:

determine if a first logical block address of the second cache is present in the first cache;

in response to a determination that the first logical block address of the second cache is present in the first cache:

store a first physical address associated with the first logical block address of the second cache with the first logical block address in the first cache; and mark a record with the first logical block address in the second cache as invalid.

2. The memory system of claim 1, wherein the operations further comprise:

receiving a read request;

identifying whether a logical block address (LBA) of the read request matches an LBA of a record in the second cache;

responsive to identifying that the LBA of the read request matches the LBA of the record in the second cache, identifying a physical address from the record in the second cache; and reading a value stored in the physical address.

3. The memory system of claim 1, wherein the operations further comprise:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request matches the LBA of the record in the first cache, identifying a physical address from the record in the first cache; and reading a value stored in the physical address.

4. The memory system of claim 1, wherein the operations further comprise:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request does not match the LBA of the record in the first cache, loading a record of the LBA from a logical-to-physical table stored in a NAND storage array into the first cache; and reading a value stored in a physical address referenced by the mapping between physical and logical addresses corresponding to the write request.

5. The memory system of claim 1, wherein the operations further comprise:

sending a portion of the logical-to-physical mapping table to a host.

6. The memory system of claim 1, wherein the operations further comprise writing data associated with the write request to a NAND storage array at a physical address referenced by the mapping between physical and logical addresses corresponding to the write request.

7. The memory system of claim 1, wherein the operations further comprise:

determining if a second logical block address of the second cache is present in the first cache;

in response to a determination that the first logical block address of the second cache is not present in the first cache:

saving a portion of the first cache to a logical-to-physical mapping table in a NAND storage array; and replacing the portion of the first cache with a different portion from the second cache.

8. A non-transitory, machine-readable medium, storing instructions, which when executed by a machine, causes the machine to perform operations comprising:

receive a write request;

responsive to receiving the write request, compare an amount of data to be written in the write request to a threshold amount of data;

responsive to a determination that the amount of data to be written in the write request exceeds the threshold amount of data, storing a mapping between a physical and logical address corresponding to the write request in a first cache, the first cache configured to store, in a volatile memory, contiguous portions of a logical-to-physical mapping table indexed by logical block address;

responsive to a determination that the amount of data to be written in the write request does not exceed the threshold amount of data, storing the mapping in a second cache, the second cache configured to store, in a volatile memory, non-contiguous portions of the logical-to-physical mapping table indexed by logical block address;

determine if the second cache is full; and in response to a determination that the second cache is full:

determine if a first logical block address of the second cache is present in the first cache;

in response to a determination that the first logical block address of the second cache is present in the first cache:

store a first physical address associated with the first logical block address of the second cache with the first logical block address in the first cache; and mark a record with the first logical block address in the second cache as invalid.

9. The non-transitory, machine-readable medium of claim 8, wherein the operations further comprise:

receiving a read request;

identifying whether a logical block address (LBA) of the read request matches an LBA of a record in the second cache;

responsive to identifying that the LBA of the read request matches the LBA of the record in the second cache, identifying a physical address from the record in the second cache; and reading a value stored in the physical address.

10. The non-transitory, machine-readable medium of claim 8, wherein the operations further comprise:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request matches the LBA of the record in the first cache, identifying a physical address from the record in the first cache; and reading a value stored in the physical address.

11. The non-transitory, machine-readable medium of claim 8, wherein the operations further comprise:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request does not match the LBA of the record in the first cache, loading a record of the LBA from a logical-to-physical table stored in a NAND storage array into the first cache; and reading a value stored in a physical address referenced by the mapping between physical and logical addresses corresponding to the write request.

12. The non-transitory, machine-readable medium of claim 8, wherein the operations further comprise:

sending a portion of the logical-to-physical mapping table to a host.

13. The non-transitory, machine-readable medium of claim 8, wherein the operations further comprise writing data associated with the write request to a NAND storage array at a physical address referenced by the mapping between physical and logical addresses corresponding to the write request.

14. The non-transitory, machine-readable medium of claim 8, wherein the operations further comprise:

determining if a second logical block address of the second cache is present in the first cache;

in response to a determination that the first logical block address of the second cache is not present in the first cache:

saving a portion of the first cache to the logical-to-physical mapping table in a NAND storage array; and replacing the portion of the first cache with a different portion from the second cache.

15. A method comprising:

receive a first write request;

responsive to receiving the first write request, compare an amount of data to be written in the first write request to a threshold amount of data;

responsive to a determination that the amount of data to be written in the first write request exceeds the threshold amount of data, storing a mapping between a physical and logical address corresponding to the first write request in a first cache, the first cache configured to store, in a volatile memory, contiguous portions of a logical-to-physical mapping table indexed by logical block address;

receiving a second write request;

responsive to receiving the second write request, compare an amount of data to be written in the second write request to the threshold amount of data;

responsive to a determination that the amount of data to be written in the second write request does not exceed the threshold amount of data, storing a mapping between a physical and logical address corresponding to the second write request in a second cache, the second cache configured to store, in a volatile memory, non-contiguous portions of the logical-to-physical mapping table indexed by logical block address;

determine if the second cache is full; and in response to a determination that the second cache is full:

determine if a first logical block address of the second cache is present in the first cache;

in response to a determination that the first logical block address of the second cache is present in the first cache:

store a first physical address associated with the first logical block address of the second cache with the first logical block address in the first cache; and mark a record with the first logical block address in the second cache as invalid.

16. The method of claim 15, further comprising:

receiving a read request;

identifying whether a logical block address (LBA) of the read request matches an LBA of a record in the second cache;

responsive to identifying that the LBA of the read request matches the LBA of the record in the second cache, identifying a physical address from the record in the second cache; and reading a value stored in the physical address.

17. The method of claim 15, further comprising:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request matches the LBA of the record in the first cache, identifying a physical address from the record in the first cache; and reading a value stored in the physical address.

18. The method of claim 15, further comprising:

receiving a read request;

identifying whether a logical block address (LBA) of the read request matches an LBA of a record in the second cache;

responsive to identifying that the LBA of the read request does not match the LBA of the record in the second cache, identifying whether the LBA of the read request matches an LBA of a record in the first cache;

responsive to identifying that the LBA of the read request does not match the LBA of the record in the first cache, loading a record of the LBA from a logical-to-physical table stored in a NAND storage array into the first cache; and reading a value stored in a physical address referenced by the mapping between physical and logical addresses corresponding to the write request.

19. The method of claim 15, further comprising:

sending a portion of the logical-to-physical mapping table to a host.

20. The method of claim 15, further comprising writing data associated with the first write request to a NAND storage array at a physical address referenced by the mapping between physical and logical addresses corresponding to the write request.

* * * * *